(12) United States Patent
Mitsuda et al.

(10) Patent No.: US 6,627,894 B2
(45) Date of Patent: Sep. 30, 2003

(54) METHOD FOR READING SIGNALS FROM PLURAL ELEMENTS SIMULTANEOUSLY

(75) Inventors: Kazuhisa Mitsuda, Sagamihara (JP); Toshiyuki Miyazaki, Sagamihara (JP)

(73) Assignee: The Institute of Space and Astronautical Science, Sagamihara (JP)

( * ) Notice: Subject to any disclaimer, the term of this patent is extended or adjusted under 35 U.S.C. 154(b) by 40 days.

(21) Appl. No.: 10/052,206

(22) Filed: Jan. 15, 2002

(65) Prior Publication Data

US 2002/0115572 A1 Aug. 22, 2002

(30) Foreign Application Priority Data

Jan. 16, 2001 (JP) .......................................... 2001-007647

(51) Int. Cl.[7] ................................................. G01T 1/24
(52) U.S. Cl. ............................ 250/370.06; 250/370.08; 250/370.09; 250/214 R; 348/320; 348/302
(58) Field of Search ......................... 250/370.06, 338.1, 250/332, 349, 370.08, 370.09, 214 R; 348/302, 313, 320, 322, 324; 356/221, 222, 226

(56) References Cited

U.S. PATENT DOCUMENTS

| | | | | |
|---|---|---|---|---|
| 4,054,797 A | * | 10/1977 | Milton et al. | 250/332 |
| 4,959,724 A | * | 9/1990 | Ueda | 348/320 |
| 4,996,413 A | * | 2/1991 | McDaniel et al. | 250/370.09 |
| 5,051,831 A | * | 9/1991 | Hashimoto | 348/302 |
| 5,184,018 A | * | 2/1993 | Conrads et al. | 250/370.09 |
| 5,777,336 A | * | 7/1998 | Silver et al. | 250/370.06 |
| 5,818,898 A | * | 10/1998 | Tsukamoto et al. | 250/370.09 |
| 5,852,296 A | * | 12/1998 | Tsukamoto et al. | 250/370.09 |
| 6,232,606 B1 | * | 5/2001 | Singh | 250/370.09 |
| 6,310,350 B1 | * | 10/2001 | Silver et al. | 250/370.06 |
| 6,399,950 B1 | * | 6/2002 | Kimura et al. | 250/370.09 |
| 6,453,008 B1 | * | 9/2002 | Sakaguchi et al. | 250/370.09 |
| 6,456,689 B2 | * | 9/2002 | Kim et al. | 250/370.09 |

FOREIGN PATENT DOCUMENTS

JP      2002214040 A   *   7/2002

* cited by examiner

Primary Examiner—Diego Gutierrez
Assistant Examiner—Madeline Gonzalez
(74) Attorney, Agent, or Firm—Stoel Rives LLP

(57) ABSTRACT

Microcalorimeters are arranged in a n×m matrix, and plural element groups are composed of the microcalorimeters. Each element group is composed of n calorimeters arranged in a column. AC biases having different frequencies are applied to their respective element groups. The elements produce output signals in response to given external information. The output signals from corresponding elements belonging to their respective different element groups are superimposed on their respective AC biases and added with signal adders. A multiplex signal of the thus added output signals can be taken out on one signal line and read. Each microcalorimeter is placed in a bridge-type circuit to cancel out the AC bias in the output in the absence of a signal in the microcalorimeter.

21 Claims, 1 Drawing Sheet

METHOD FOR READING SIGNALS FROM PLURAL ELEMENTS SIMULTANEOUSLY

BACKGROUND OF THE INVENTION

1. Field of the Invention

This invention relates to a method for reading signals from plural elements simultaneously, and is particularly usable for radiation ray measurement using an imaging type super high energy-resolution X-ray detector and thermal measurement using an imaging type super sensitive infrared detector.

2. Description of the Prior Art

Microcalorimeters are employed as super high energy-resolution X-ray detectors or highly sensitive infrared detectors. Recently, it has been proposed to use microcalorimeters as imaging elements of X-ray or infrared cameras of an astronomical observatory orbiting in space. At present, the camera is composed of plural microcalorimeters, and the signals of each microcalorimeter are read out independently.

In this case, a microcalorimeter requires multiple wires to apply a bias voltage and multiple wires to read out signals.

On the other hand, a microcalorimeter is usually operated at a very low temperature of about 0.1 to 4.2 K. Therefore, a camera requires that many wires be drawn out from the camera situated at a very low temperature to measurement electronics situated at room temperature. As a result, conventional microcalorimeter cameras have only tens of imaging elements, and thus the effective field of view is restricted. Thus multiple camera pointings are required to observe spatially extended objects.

To solve this problem, attempts have been made to switch and read out signals from plural microcalorimeters in sequence using SQUIDs at high switching speeds. Such a technique enables read out signals from plural microcalorimeters by a pair of cables and increases the field of view of the camera. However, there are many technical problems associated with such high speed switching of SQUIDs, and, thus, there are practical limits to applications of the above-mentioned technique.

SUMMARY OF THE INVENTION

It is an object of the present invention to provide a method for reading signals from plural microcalorimeters at once without providing many wires between low temperature sensor stage and room temperature measurement electronics.

For achieving the above object, this invention relates to a method for reading signals from plural elements simultaneously, comprising the steps of providing plural elements and composing plural element groups of the elements, driving the element groups by AC biases having their respective different frequencies, adding signals from the elements belonging to their respective different element groups, and taking out on one signal line and reading a multiplex signal composed of the thus added signals.

In a preferred embodiment of the present invention, plural elements are arranged in n×m matrix to compose plural element groups. Each element group is composed of n elements arranged in a column. Then, the element groups are driven by AC biases having their respective different frequencies, and the signals from the elements belonging to their respective different element groups are added at every line. Then, a multiplex signal composed of the thus added signals is taken out on one signal line and read.

In the signal reading method of the present invention, AC biases of different frequencies are applied to their respective element groups. That is, a different AC bias is superimposed as a carrier signal on the elements of every element group. Therefore, when the signals from corresponding elements of every element group are added, a multiplex signal can be obtained from all of the element groups in a frequency space. Moreover, according to the present invention, the multiplex signal is taken out on one signal line, i.e., the multiplex signal can be obtained by using only one signal line. As a result, signals from plural elements can be read simultaneously in the absence of separate wires for each of the respective elements.

In the case of an application of AC biases of relatively large amplitudes in the presence of relatively small signals obtained from the elements, the superposition of the AC biases on the signals may result in cancellation of the signals obtained from the elements. Therefore, it is desired that each element be set in a bridge-type circuit so that the amplitudes of the AC biases can be effectively reduced, and the signals obtained from the elements can be taken out precisely.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to the accompanying drawings.

Figure 1:
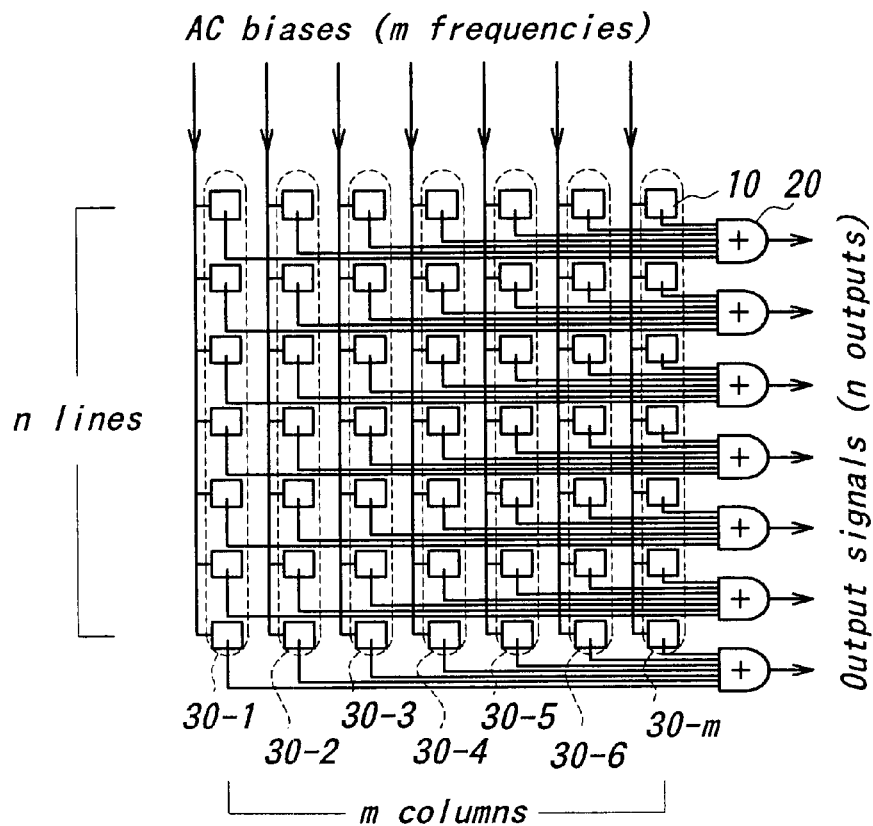
FIG. 1 is a conceptual view showing a preferred embodiment in a method for reading signals from plural elements simultaneously, according to the present invention.

FIG. 1 is a conceptual view showing a preferred embodiment of an electronic circuit implementing a method for reading signals from plural elements simultaneously, according to the present invention. In FIG. 1, plural microcalorimeters 10 comprising photo acceptance elements are arranged vertically in columns and laterally in lines. Specifically, "n" microcalorimeters 10 are arranged vertically, and "m" microcalorimeters 10 are arranged laterally. A signal adder 20 is connected to "m" microcalorimeters 10 of each of the lines. The output signals from microcalorimeters 10 are, therefore, added at every line to obtain a multiplex signal for each of the lines. As shown in dashed lines in FIG. 1, one element group is composed of n microcalorimeters 10 arranged vertically at every column.

AC biases of different frequencies are applied to the element groups 30-1 to 30-m composed of vertically arranged microcalorimeters at every column. In this case, calorimeters 10 are set to an operational state, and when it detects external information such as an X-ray photon, microcalorimeter 10 provides an output signal modulated by an AC bias. As a result, an output signal modulated by AC bias frequencies can be obtained from each microcalorimeter 10.

The output signals from microcalorimeters 10 in each line are added by a signal adder 20, and thus, signals are multiplexed in frequency domain. The signals from them can therefore be taken out by a pair of signal lines from low temperature sensors to room temperature electronics even though wires for readout are not provided for each microcalorimeter.

Therefore, the reading method of the present invention can be applied to microcalorimeter cameras composed of plural microcalorimeters without providing many wires between sensors and measurement instruments.

The frequencies of the AC biases applied to the element groups 30-1 to 30-m are set much higher than the signal bandwidth (typically, 10 kHz) of microcalorimeters 10. The bandwidth separation between adjacent AC bias frequencies is set wider than the bandwidth of the signal frequencies.

If microcalorimeters 10 are superconducting transition edge sensor (TES) microcalorimeters, signal adder 20 can be, for example, a multiple input type SQUIDs or a multiple input transformer. If microcalorimeters 10 are made of a high impedance semiconductor type microcalorimeter, signal adder 20 can be a summing circuit composed of transistors.

Figure 2:
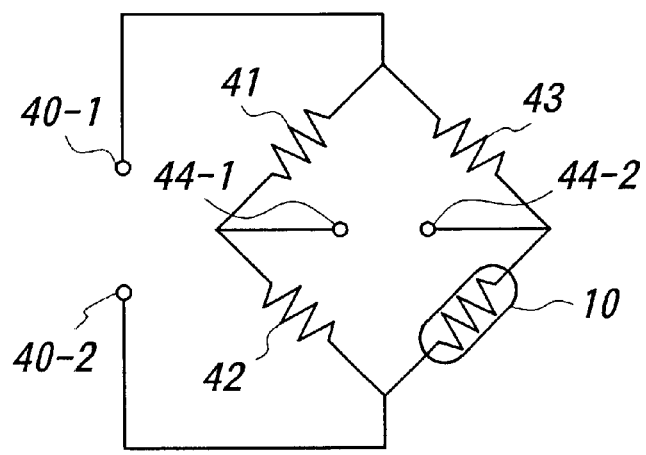
FIG. 2 is a conceptual view of a single element 10 shown in FIG. 1.

FIG. 2 is a conceptual view showing preferred embodiment of a single element 10, shown in FIG. 1, according to the present invention. As mentioned above, if the output signals of the microcalorimeters are much smaller than the amplitudes of the AC biases, the output signals may be obscured by AC biases and/or the signals cannot be processed properly in the front-end electronics because of limited dynamic range. In this case, a bridge-type circuit is adopted.

The AC bias is applied to input terminals 40-1 and 40-2. When the AC bias amplitude is adjusted to satisfy the condition to balance the bridge, i.e. (resistance of 41):(resistance of 42)=(resistance of 43):(resistance of 10), the AC bias is cancelled at the output terminals 44-1 and 44-2. Only when element 10 has an input such as X-ray energy, a nonzero output, i.e. a signal modulated by the AC bias, appears at output terminals 44-1 and 44-2.

Moreover, the AC biases applied to two devices may have identical frequencies if the phases are offset by 90 degrees. In this case, signals from each microcalorimeter can be added without confusion. Therefore, the number of AC bias frequencies can be reduced to one-half of the number used for a given signal bandwidth.

It is desirable to increase the number of microcalorimeters as much as possible. Reading out plural microcalorimeter simultaneously without confusion requires the use of different AC bias frequencies. Therefore, increasing the number of pixels requires widening the readout bandwidth in the frequency domain. However, the whole frequency bandwidth of signals must be within the bandwidth of the signal adder.

However, if the phases of the AC biases applied to two microcalorimeters are offset by 90 degrees, the number of AC bias frequencies can be reduced. In this case, with a given bandwidth of the signal adder, the number of sensors, i.e., field of view, can be increased by a factor of two.

For example, instead of AC biases having their respective different frequencies f1, f2, f3, f4, f5, and f6, the microcalorimeters 30-1 to 30-6 can be driven by AC biases composed of a f1 sine wave, a f1 cosine wave, a f2 sine wave, a f2 cosine wave, a f3 sine wave, and a f3 cosine wave. That is, the element groups 30-1 to 30-6 can be driven by only three, instead of six, bias frequencies.

Although the present invention is described in detail with reference to the above examples, this invention is not limited to the above disclosure and every kind of variation and modification may be made without departing from the scope of the present invention.

In the above embodiment, the element groups composed of plural microcalorimeters are employed, and the AC biases of different frequencies are applied to their respective element groups to drive microcalorimeters of the element groups. In an alternative embodiment, for example, such element groups are not employed and AC biases having their respective different frequencies may be applied directly to all of the microcalorimeters.

In this case, the signals from the microcalorimeters may be added by signal adders composed of, for example, multiplex input type SQUIDs. Also, for reducing the amplitudes of the AC biases, a bridge-type circuit may be provided in which each of the microcalorimeters is set. Moreover, for reducing the numbers of frequencies of the AC biases, every two devices may receive AC bias signals of the same frequency but with phases offset by 90 degrees.

Although in the above embodiment, the phases of the AC biases to be applied are offset from one another by 90 degrees, that is sufficient only if at least one phase of the AC biases is varied for the other phases of the AC biases by 90 degrees.

Moreover, although in the above embodiment plural microcalorimeters are employed as photo acceptance elements, other elements may be employed such as elements to which a bias current/voltage is applied and thus from which a given current or voltage is read. Specifically, a thermistor or a semiconductor thermometer may be employed as a photo acceptance element.

According to the present invention, plural element groups are driven by AC biases having their respective different frequencies. The output signals from the elements of the element groups are superimposed on the respective AC biases as carrier signals and added. Therefore, a multiplex signal composed of the added output signals can be taken out on one signal line. As a result, such a multiplex signal can be read without need for many signal reading wires.

What is claimed is:

1. A method for reading signals from plural elements simultaneously, comprising the steps of:
    providing plural elements and composing plural element groups of the elements;
    driving the element groups by AC biases having their respective different frequencies;
    adding the signals from the elements belonging to their respective different element groups; and
    taking out on one signal line and reading a multiplex signal composed of the thus added signals.

2. A reading method as defined in claim 1, further comprising multiple bridge-type circuits, and wherein a different one of the elements is set in each of the bridge-type circuits.

3. A reading method as defined in claim 1, wherein the signals are added with a signal adder.

4. A reading method as defined in claim 3, wherein the signal adder is made of a multiplex input type superconducting quantum interference device or a multiplex input type transformer.

5. A reading method as defined in claim 1, wherein each of the plural elements includes a photo acceptance element.

6. A reading method as defined in claim 5, wherein each of the plural elements includes a microcalorimeter as a photo acceptance element.

7. A reading method as defined in claim 1, wherein each of the AC biases has a phase and at least one phase of the AC biases is offset by 90 degrees from the other phases of the AC biases.

8. A method for reading signals from plural elements simultaneously, comprising the steps of:
    arranging plural elements in n×m matrix and composing m elements arranged in a line and plural element groups, each being composed of n elements arranged in a column;

driving the element groups by AC biases having their respective different frequencies;

adding the signals from the elements belonging to their respective different element groups at every line; and taking out on one signal line and reading a multiplex signal composed of the thus added signals.

9. A reading method as defined in claim 8, further comprising multiple bridge-type circuits, and wherein a different one of the elements is set in each of the bridge-type circuits.

10. A reading method as defined in claim 8, wherein the signals are added with a signal adder.

11. A reading method as defined in claim 10, wherein the signal adder is made of a multiplex input type superconducting quantum interference device or a multiplex input type transformer.

12. A reading method as defined in claim 8, wherein each of the plural elements includes a photo acceptance element.

13. A reading method as defined in claim 12, wherein each of the plural elements includes a microcalorimeter as a photo acceptance element.

14. A reading method as defined in claim 8, wherein each of the AC biases has a phase and at least one phase of the AC biases is offset by 90 degrees from the other phases of the AC biases.

15. A method for reading signals from plural elements simultaneously, comprising the steps of:

preparing plural elements;

driving the elements by AC biases having their respective different frequencies;

adding the signals from the elements; and taking out on one signal line and reading a multiplex signal composed of the thus added signals.

16. A reading method as defined in claim 15, further comprising multiple bridge-type circuits provided, and wherein a different one of the elements is set in each of the bridge-type circuits.

17. A reading method as defined in claim 15, wherein the signals are added with a signal adder.

18. A reading method as defined in claim 17, wherein the signal adder is made of a multiplex input type superconducting quantum interference device or a multiplex input type transformer.

19. A reading method as defined in claim 15, wherein each of the plural elements includes a photo acceptance element.

20. A reading method as defined in claim 19, wherein each of the plural elements includes a microcalorimeter as a photo acceptance element.

21. A reading method as defined in claim 15, wherein each of the AC biases has a phase and at least one phase of the AC biases is offset by 90 degrees from the other phases of the AC biases.

* * * * *